United States Patent
Minoda (10) Patent No.: US 7,983,127 B2
(45) Date of Patent: Jul. 19, 2011

(54) OPTICAL DISK DEVICE AND PARAMETER SELECTION METHOD

(75) Inventor: Hiroshi Minoda, Yokohama (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 548 days.

(21) Appl. No.: 12/173,839

(22) Filed: Jul. 16, 2008

(65) Prior Publication Data
US 2009/0265728 A1 Oct. 22, 2009

(30) Foreign Application Priority Data
Aug. 30, 2007 (JP) .................................. 2007-224747

(51) Int. Cl.
*G11B 5/58* (2006.01)
(52) U.S. Cl. ............... 369/53.13; 369/53.41; 369/53.42; 369/53.12; 369/53.19; 369/53.2; 369/247.1
(58) Field of Classification Search .......................... None
See application file for complete search history.

(56) References Cited

U.S. PATENT DOCUMENTS
6,636,469 B2 * 10/2003 Tomishima ................ 369/53.14
2004/0013066 A1 * 1/2004 Oono et al. ................ 369/53.14
2006/0044963 A1 * 3/2006 Takahashi .................. 369/44.28

FOREIGN PATENT DOCUMENTS
JP       2003-132620      5/2003

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

Provided is an optical disk device installed in a personal computer, including: an information creation unit that creates identification information for identifying the type of the personal computer based on a command transmitted from the personal computer; and a parameter selection unit that conducts switching, for parameter selection, concerning a parameter indicating an amount of unbalance of an optical disk, which has previously been determined depending on the type of the personal computer, in accordance with the identification information created by the information creation unit.

10 Claims, 7 Drawing Sheets

OPTICAL DISK DEVICE AND PARAMETER SELECTION METHOD

CROSS-REFERENCES TO RELATED APPLICATIONS

This application relates to and claims priority from Japanese Patent Application No. 2007-224747, filed on Aug. 30, 2007, the entire disclosure of which is incorporated herein by reference.

BACKGROUND

The present invention generally relates to an optical disk device and a parameter selection method, and is suitable for use in, for example, an optical disk device installed in a personal computer.

Conventionally, because self vibration of the optical disk device due to the unbalance of the optical disk differs depending on the degree of fixation of the optical disk device with respect to the personal computer in which the optical disk device is installed, a technique has widely been utilized in which: after an optical disk device is installed in a personal computer, the unbalance amount of an optical disk is detected and self vibration of the optical disk device is measured; and the rotation speed of the optical disk is limited in accordance with the vibration amount.

As such a technique, JP2003-132620 A discloses a technique in which: threshold value storage means for storing a vibration detection threshold value in a rewritable area is provided; when updating the threshold value, a new threshold value is determined based on a value that is detected, by vibration detection means, when disk rotation means is controlled to rotate an optical disk at an arbitrary rotation speed, and the determined threshold value is stored in the threshold value storage means.

SUMMARY

Due to, e.g., the increase in complexity in installing an optical disk device in a personal computer that accompanies any decrease in size and weight of a notebook personal computer, even if optical disk devices are the same in type and also the optical disk devices are delivered to the same client, amount of unbalance of optical disks need to be detected by different types of firmware in the optical disk devices for each type of personal computer in which the relevant optical disk device is installed.

Therefore, there is a situation where many types of firmware, which correspond to types of personal computers, each exist in optical disk devices that are installed in the personal computer.

This case involves a problem in that a supplier of optical disk devices and a client serving as a delivery destination for the optical disk devices both need to manage the optical disk devices for each type of personal computers in which the optical disk device are installed, leading to troublesome management of the optical disk devices.

The invention has been made in light of the above, and provides an optical disk device and a parameter selection method that enable the management of optical disk devices to be easier.

In order to attain the above object, according to the invention, provided is an optical disk device installed in a personal computer, including: an information creation unit that creates identification information for identifying the type of the personal computer based on a command transmitted from the personal computer; and a parameter selection unit that conducts switching, for parameter selection, concerning a parameter indicating an amount of unbalance of an optical disk, which has previously been determined depending on the type of the personal computer, in accordance with the identification information created by the information creation unit.

Accordingly, personal computers of plural types for different systems can be dealt with by only installing optical disk devices each having firmware of the same type even when an optical disk device having firmware in which an unbalance detection parameter is set depending on the type of the personal computer, is not installed in each of the personal computers.

Also, according to the invention, provided is a parameter selection method of an optical disk device installed in a personal computer, including: a first step of creating identification information for identifying the type of the personal computer based on a command transmitted from the personal computer; and a second step of conducting switching, for parameter selection, concerning a parameter indicating an amount of unbalance of an optical disk, which has previously been determined depending on the type of the personal computer, in accordance with the identification information created in the first step.

Accordingly, personal computers of plural types for different systems can be dealt with by only installing optical disk devices each having firmware of the same type even when an optical disk device having firmware in which an unbalance detection parameter is set depending on the type of the personal computer, is not installed in each of the personal computers.

According to the invention, an optical disk device and a parameter selection method that enable the management of optical disk device to be easier can be realized.

Other aspects and advantages of the invention will be apparent from the following description and the appended claims.

BRIEF DESCRIPTION OF THE DRAWINGS

FIG. 4 is a flowchart showing a procedure for processing executed when a personal computer system is powered on.

DETAILED DESCRIPTION OF PREFERRED EMBODIMENTS

Hereinafter, an embodiment of the present invention will be described in detail with reference to the accompanying drawings.

Figure 1:
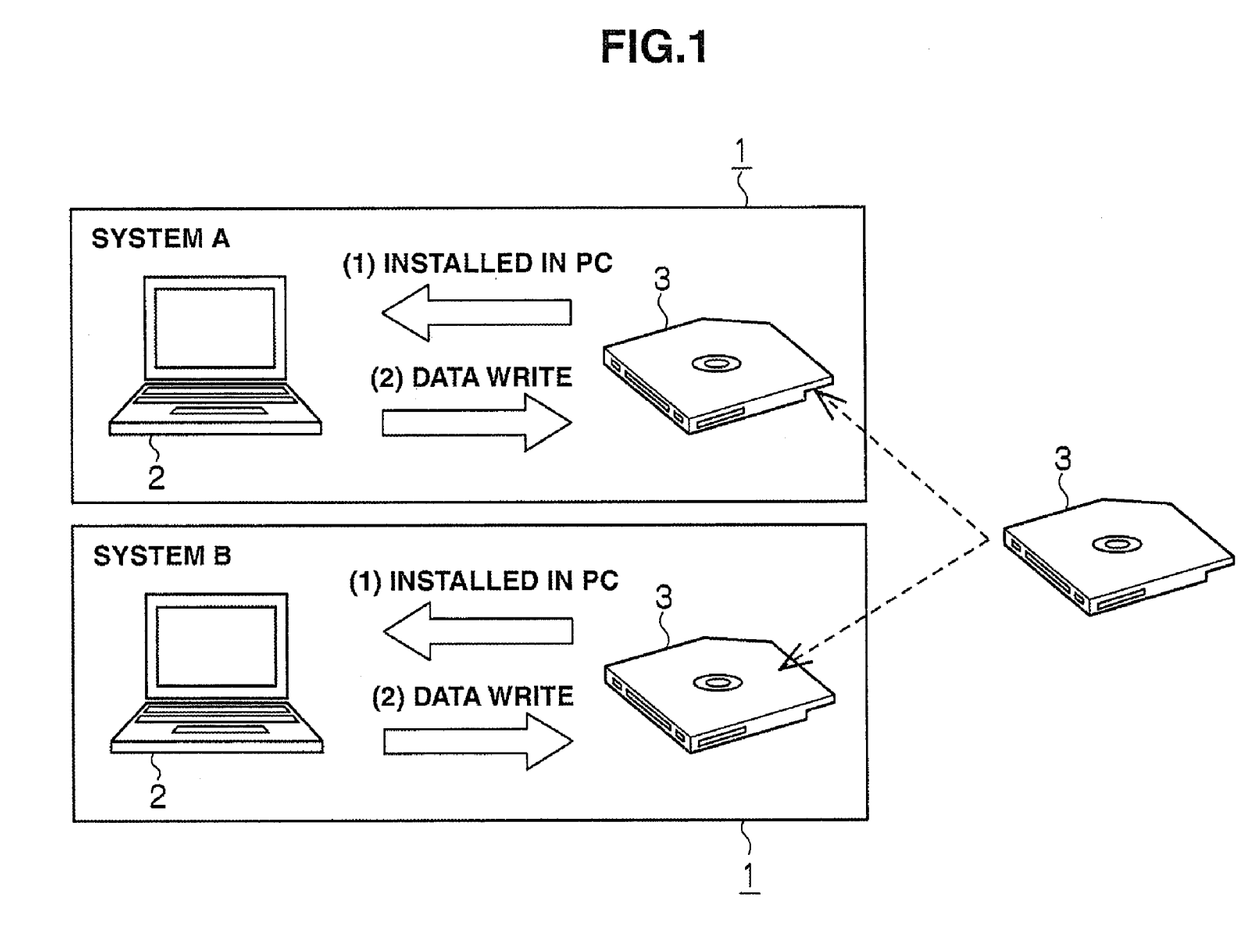
FIG. 1 is a block diagram showing a schematic configuration for personal computer systems according to an embodiment of the invention.

FIG. 1 is a schematic diagram of personal computer systems 1 according to the embodiment of the invention. Each of the personal computer systems 1 is configured by installing an optical disk device 3 in a personal computer (PC) 2.

Each of the personal computer systems 1 according to this embodiment provides a scheme in which, when the optical disk device 3 is installed in the personal computer 2, a rotation speed of an optical disk (described later) 11 is set by switching an unbalance detection parameter previously determined depending on the type of the personal computer 2. Note that the unbalance detection parameter is a parameter of a threshold value indicative of the detected amount of unbalance of the optical disk 11, and the rotation speed of the optical disk 11 is limited based on the value of the unbalance detection parameter.

Specifically, when the optical disk device 3 is installed in the personal computer 2, the personal computer 2 issues a data write command to the optical disk device 3. The optical disk device 3 has a data rewriteable area 54 (described later) in flash memory 21, and writes, in the data rewriteable area 54, specific data based on the data write command from the personal computer 2. The optical disk device 3 conducts switching of the unbalance detection parameter from the initial unbalance detection parameter, which has previously been stored in the optical disk device 3 and selected, to the unbalance detection parameter corresponding to the detected amount of unbalance of the optical disk 11 based on the specific data described later.

As described above, in the personal computer systems 1, the personal computers 2 of plural types for different systems, such as a personal computer in system A and a personal computer in system B, can be dealt with by only installing the optical disk devices 3 each having firmware of the same type, without installing, in each of the personal computers 2, the optical disk device 3 having firmware in which an unbalance detection parameter is set depending on the each type of the personal computers 2.

Next, the configurations for the personal computer 2 and the optical disk device 3 in this embodiment will be explained.

The personal computer 2 is a computer device equipped with information processing resources such as a CPU (Central Processing Unit) and memory (not shown in the figure), and is, e.g., a notebook personal computer. The personal computer 2 is also equipped with information input devices (not shown in the figure) such as a keyboard, switch, pointing device, and microphone and information output devices (not shown in the figure), such as a monitor display and speaker. A data write program is stored in the memory of the personal computer 2 in advance. The details of the data write program will be described below.

Figure 2:
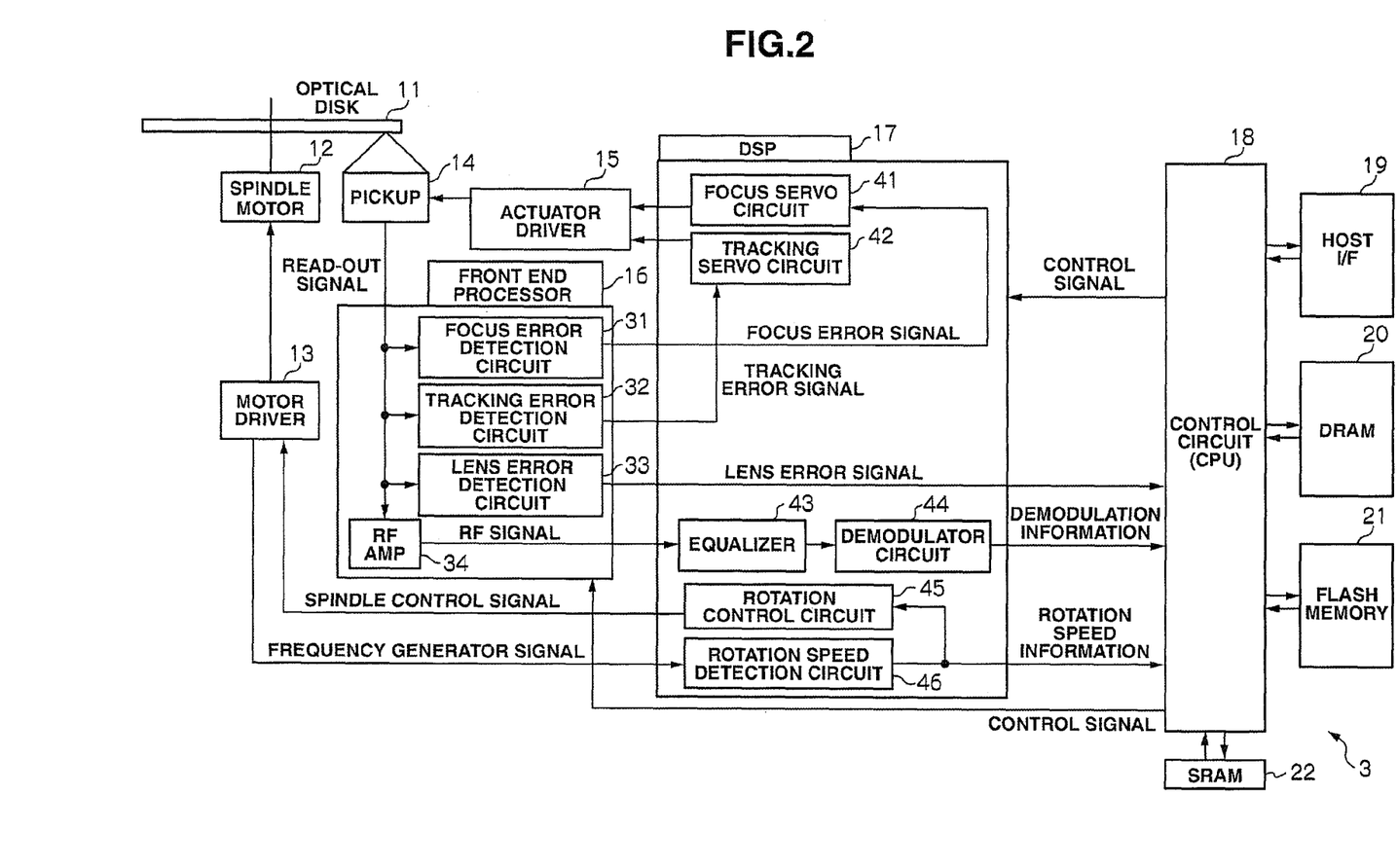
FIG. 2 is a block diagram showing a schematic configuration for an optical disk device.

FIG. 2 is a structural diagram of the optical disk device 3 according to this embodiment. The optical disk device 3 is composed of a spindle motor 12 that rotationally drives the optical disk 11, a motor driver 13 that drives the spindle motor 12, an optical pickup 14, an actuator driver 15 that drives an actuator (not shown in the figure) in the optical pickup 14, a front end processor 16, a digital signal processor (DSP) 17, a control circuit (CPU) 18, a host I/F 19 for establishing connection with the personal computer 2, DRAM (Dynamic Random Access Memory) 20, flash memory 21, and SRAM (Static Random Access Memory) 22.

The front end processor 16 processes read-out signals from the optical pickup 14 as regenerative signals. The front end processor 16 is composed of a focus error signal detection circuit 31 that detects a focus error signal from among the regenerative signals, a tracking error signal detection circuit 32 that detects a tracking error signal from among the regenerative signals, a lens error signal detection circuit 33 that detects a lens error signal from among the regenerative signals, and an RF amplifier circuit 34 that amplifies a regenerative signal to output a resultant RF signal.

The digital signal processor 17 is composed of a focus servo circuit 41 that generates a focus control signal based on a focus error signal, a tracking servo circuit 42 that generates a tracking control signal based on a tracking error signal, an equalizer 43, a demodulator circuit 44 that subjects an output signal from the equalizer 43 to demodulation processing, a rotation control circuit 45 that generates a spindle control signal for controlling the rotation of the spindle motor 12 via the motor driver 13, and a rotation speed detection circuit 46 that detects the rotation speed of the spindle motor 12 based on a frequency generator signal from the motor driver 13.

The control circuit 18 is a microcomputer that controls the entire optical disk device 3. The control circuit 18 generates a control signal based on a lens error signal from the lens error signal detection circuit 33, demodulation information from the demodulator circuit 44, and rotation speed information from the rotation speed detection circuit 46, and outputs the control signal to the front end processor 16 and the digital signal processor 17.

Figure 3:
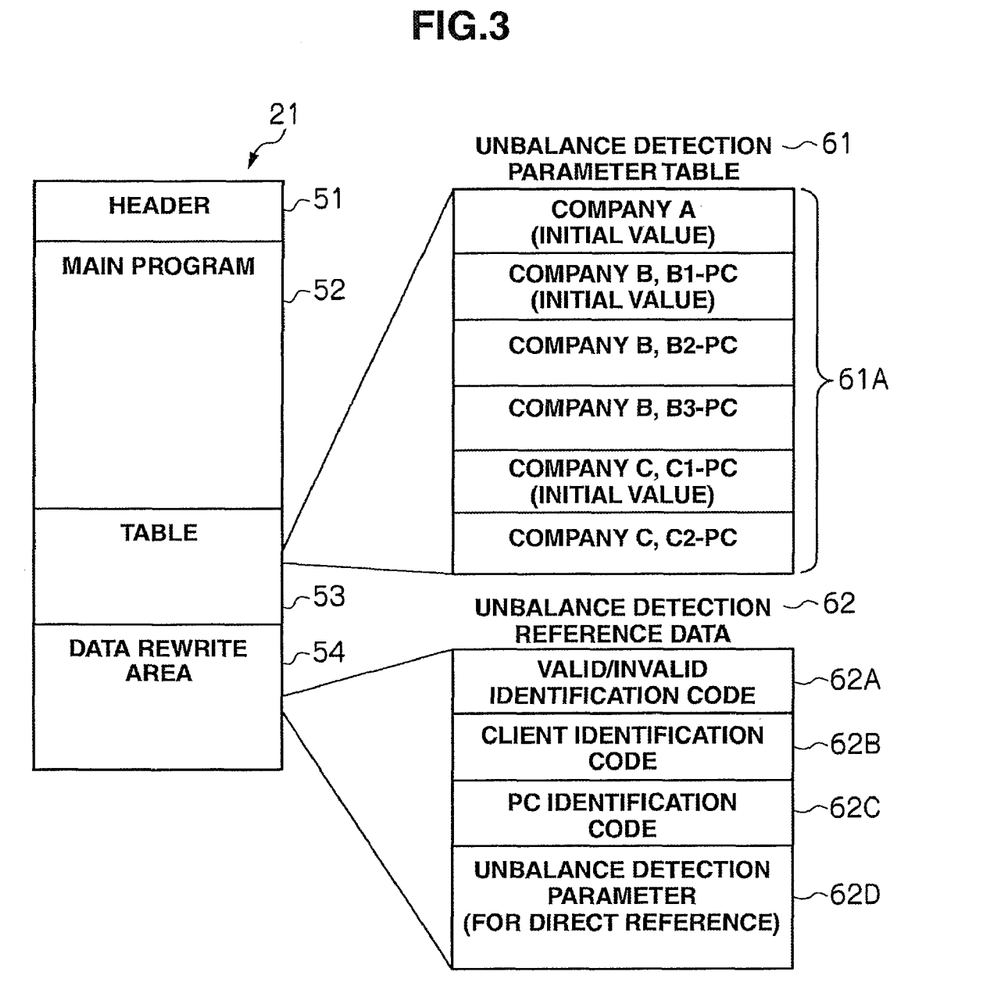
FIG. 3 is a schematic diagram explaining flash memory.

FIG. 3 is a schematic diagram of the flash memory 21 according to this embodiment. The flash memory 21 stores a header 51, a main program 52, and a table 53.

The main program 52 is composed of a control program for controlling the optical disk device 3, firmware for a client serving as a delivery destination for the optical disk device 3, and various other programs.

The table 53 is composed of an unbalance detection parameter table 61 and other various tables. The unbalance detection parameter table 61 is composed of an unbalance detection parameter column 61A that stores unbalance detection parameters previously set for respective clients, such as company A, company B, and company C, and also as necessary, set for the respective types of the personal computers 2 for each client, such as B1, and B2.

Also, in the unbalance detection parameter table 61, an initial value is determined for each client, and when the optical disk device 3 is delivered to a client from the supplier, an unbalance detection parameter having the initial value for the relevant client has been set. For example, when the optical disk device 3 is delivered to company A, the unbalance detection parameter (initial value) for company A has been set.

The flash memory 21 includes the data rewriteable area 54, and the data rewriteable area 54 stores unbalance detection reference data 62 and other various kinds of data. The unbalance detection reference data 62 is composed of a valid/invalid identification code column 62A, a client identification code column 62B, a PC identification code column 62C, and an unbalance detection parameter (for direct reference) column 62D. When the optical disk device 3 is delivered to a client, in the unbalance detection reference data 62, each of the identification code columns 62A to 62D stores "FFh".

The unbalance detection reference data 62 is data necessary for referring to the unbalance detection parameters in the unbalance detection parameter column 61A in the unbalance detection parameter table 61.

The valid/invalid identification code column 62A stores information about whether the unbalance detection reference data 62 is valid or invalid. For example, in the optical disk device 3, when the valid/invalid identification code column 62A stores the code "55h", the unbalance detection reference data 62 is judged to be valid, and when the valid/invalid identification code column 62A stores a code other than the code "55h", the unbalance detection reference data 62 is judged to be invalid.

The client identification code column 62B stores an identification code corresponding to a client. For example, in the optical disk device 3, when the client identification code column 62B stores "01h", the relevant client is company A; when the client identification code column 62B stores "02h", the relevant client is company B; and when the client identification code column 62B stores "03h", the relevant client is company C.

Incidentally, the optical disk device 3 is configured so that, for example, the client identification code managed in the main program 52 in the firmware for a client corresponds to the client identification code stored in the client identification code column 62B.

Also, for example, in the optical disk device 3, when the client identification code column 62B stores "42h", not the unbalance detection parameter in the unbalance detection parameter column 61A in the unbalance detection parameter table 61 but the unbalance detection parameter in the unbalance detection parameter (for direct reference) column 62D is referenced.

The PC identification code column 62C stores an identification code for identifying the type of the personal computer 2 in the client set in accordance with the client identification code. For example, in the optical disk device 3, when the client identification code column 62B stores "01h" and the PC identification code column 62C stores "01h", this indicates the company A, A1-PC personal computer 2.

Also, for example, in the optical disk device 3, when the client identification code column 62B stores "02h" and the PC identification code column 62C stores "01h", this indicates the company B, B1-PC personal computer 2. When the client identification code column 62B stores "02h" and the PC identification code column 62C stores "02h", this indicates the company B, B2-PC personal computer 2.

Moreover, for example, in the optical disk device 3, when the client identification code column 62B stores "03h" and the PC identification code column 62C stores "01h", this indicates the company C, C1-PC personal computer 2. When the client identification code column 62B stores "03h" and the PC identification code column 62C stores "02h", this indicates the company C, C2-PC personal computer 2.

The unbalance detection parameter (for direct reference) column 62D stores an unbalance detection parameter where that unbalance detection parameter is referenced directly without referring to the unbalance detection parameter in the unbalance detection parameter column 61A in the unbalance detection parameter table 61.

Figure 4:
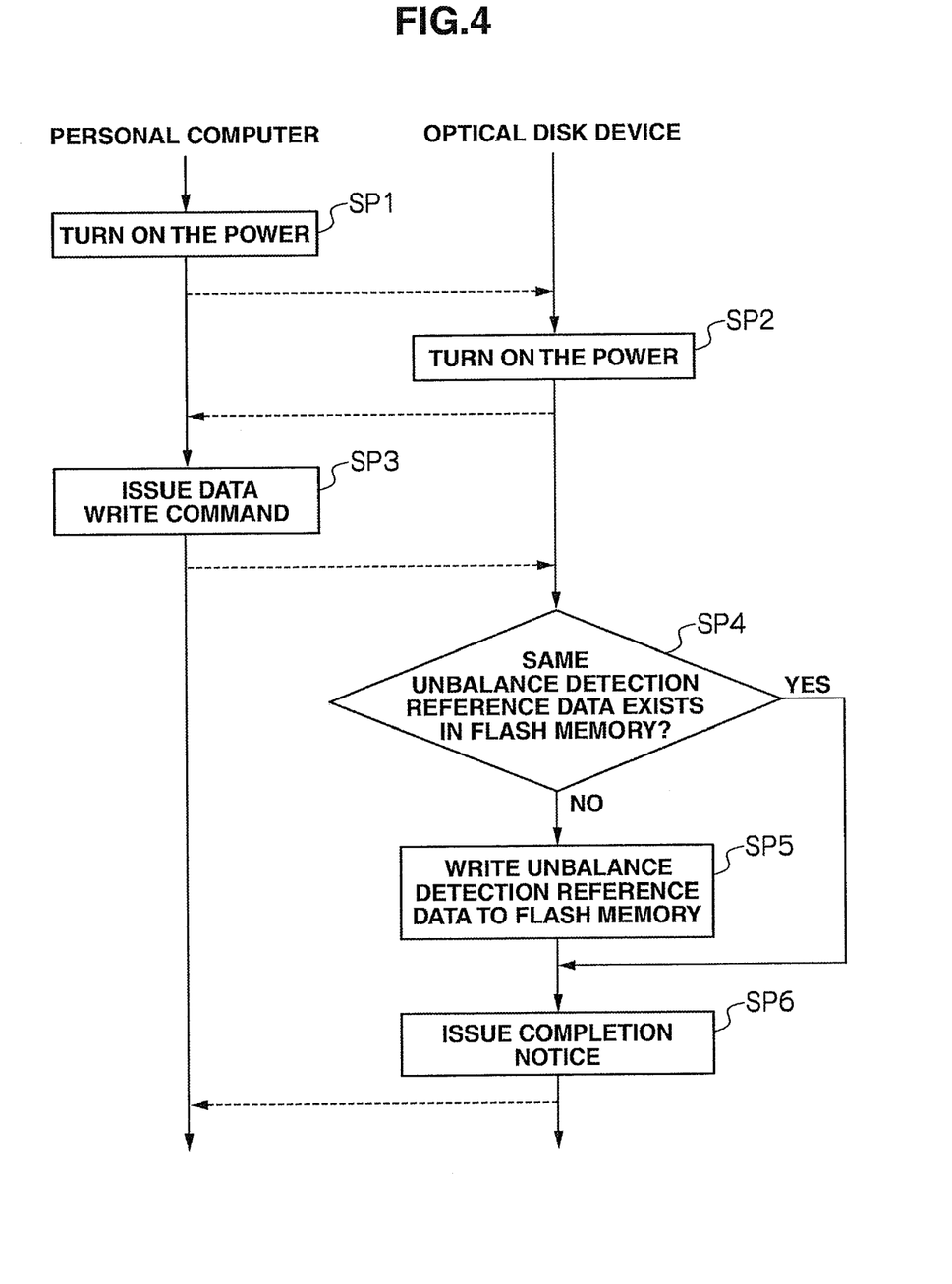

Next, the flow of processing when the personal computer system 1 is turned on the power in this embodiment will be described.

FIG. 4 shows an example of a flowchart showing a specific processing procedure of the CPU in the personal computer 2 and the control circuit 18 in the optical disk device 3 regarding processing executed when the personal computer system 1 is turned on the power.

The CPU in the personal computer 2, for example, when an instruction to turn on the power to the personal computer 2 is given by an operator of the personal computer 2 or at a predetermined time, and results in power being supplied, turns on the power to the personal computer 2 (SP1), and then turns on the power to the optical disk device 3 (SP2).

When supplied with power, the control circuit 18 in the optical disk device 3 performs a self-diagnostic for the optical disk device 3, issues a completion notice that the self-diagnostic has been completed, and transmits the completion notice to the personal computer 2.

When the self-diagnostic completion notice is transmitted to the personal computer 2 from the optical disk device 3, the CPU in the personal computer 2 completes the recognition of the optical disk device 3.

Then the CPU in the personal computer 2 executes the data write program stored in the memory to issue a data write command and transmit it to the optical disk device 3 (SP3).

The data write command is composed of the client identification code, the PC identification code, etc., for the personal computer 2, and also includes the unbalance detection parameter where the unbalance detection parameter, not the unbalance detection parameter in the unbalance detection parameter column 61A in the unbalance detection parameter table 61, is referenced directly.

As described above, in the optical disk device 3, where the unbalance detection parameter in the unbalance detection parameter column 61A in the unbalance detection parameter table 61 is not referenced and the unbalance detection parameter in the unbalance detection parameter (for direct reference) column 62D is referenced directly, the data write command including the unbalance detection parameter is issued and transmitted to the optical disk device 3, which allows the optical disk device 3 to select an arbitrary unbalance detection parameter.

The control circuit 18 in the optical disk device 3 creates the unbalance detection reference data 62 based on the data write command transmitted from the personal computer 2, and checks whether or not the same unbalance detection reference data exists in the flash memory 21 (SP4).

If the same unbalance detection reference data 62 does not exist in the flash memory 21 (SP4: NO), the control circuit 18 in the optical disk device 3 writes the created unbalance detection reference data 62 to the flash memory 21 to store the data (SP5).

Meanwhile, if the same unbalance detection reference data 62 exists in the flash memory 21 (SP4: YES), the control circuit 18 in the optical disk device 3 proceeds to step SP6.

As described above, in the optical disk device 3, where the same unbalance detection reference data 62 exists in the flash memory 21, the created unbalance detection reference data 62 is not stored in the flash memory 21. Therefore, the number of times for rewrite to the flash memory 21 is reduced, leading to an increase in the 'life' of the flash memory 21.

Then, the control circuit 18 in the optical disk device 3 issues a completion notice that the processing in accordance with the data write command has been completed, and transmits the completion notice to the personal computer 2 (SP6).

Figure 5:
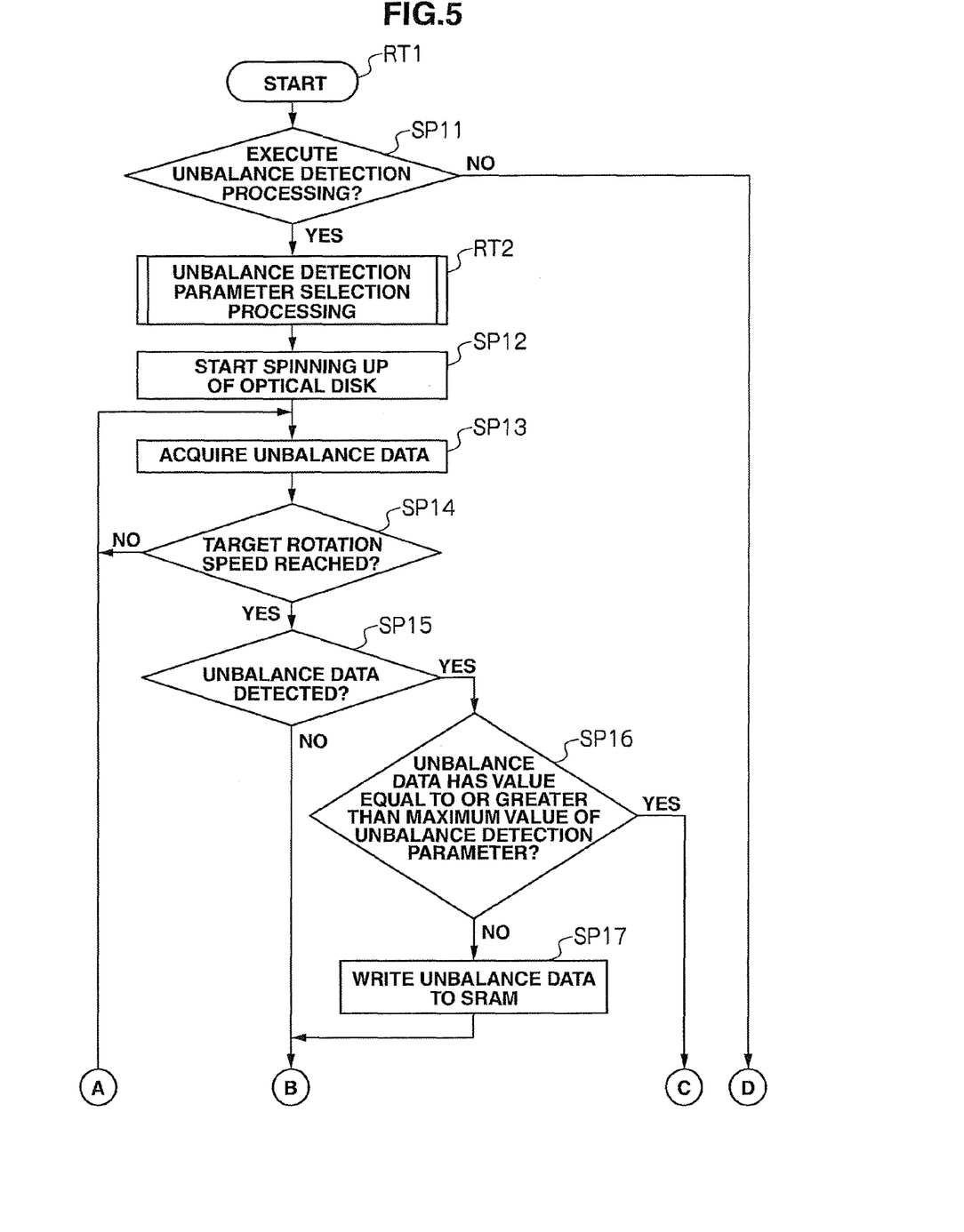
FIG. 5 is a flowchart showing a procedure for rotation speed limitation processing based on unbalance of an optical disk.
Figure 6:
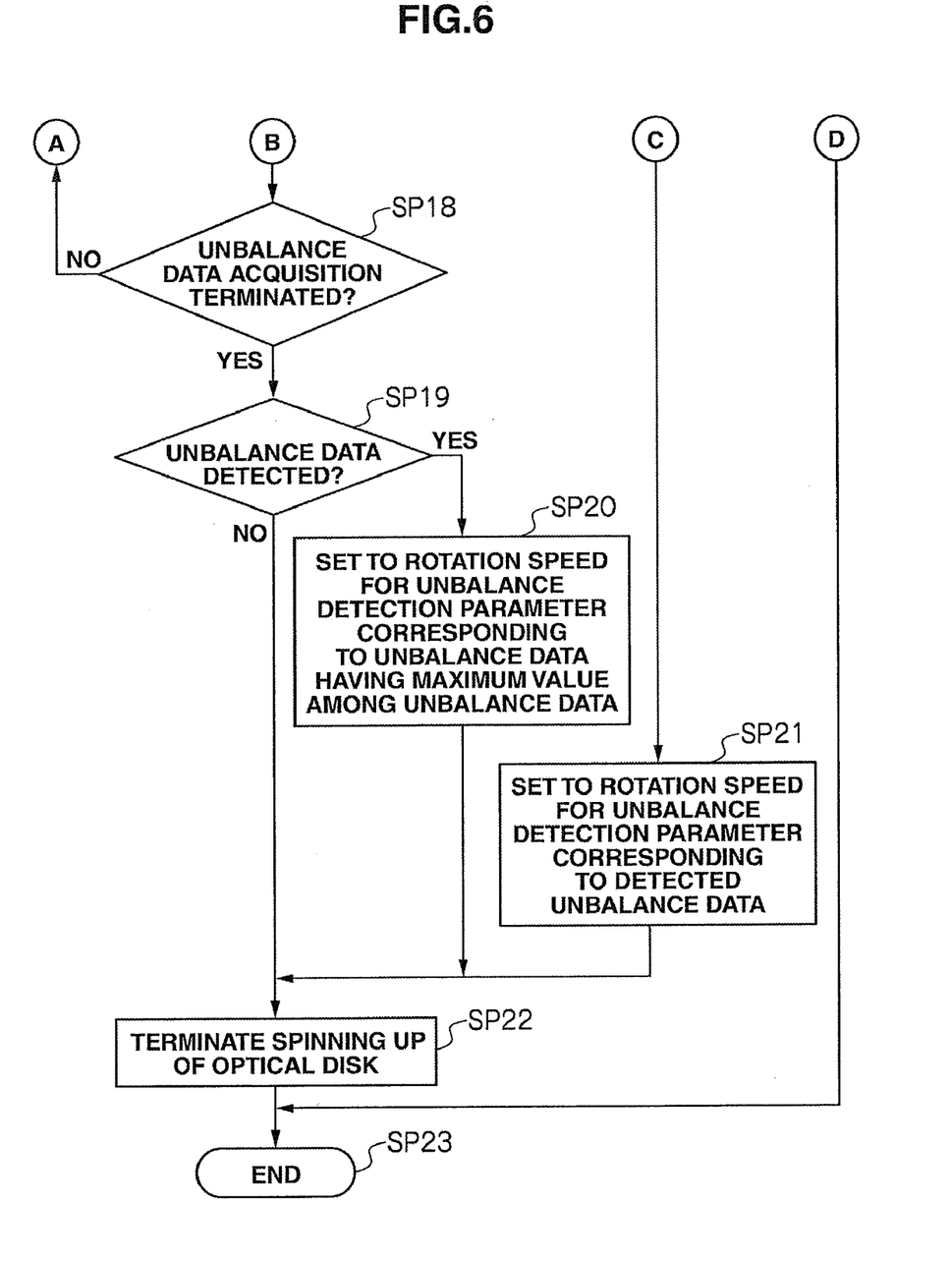
FIG. 6 is a flowchart showing a procedure for rotation speed limitation processing based on unbalance of an optical disk.

Next, rotation speed limitation processing based on unbalance of the optical disk 11 in the optical disk device 3 in the personal computer system 1 in this embodiment will be described.

FIGS. 5 and 6 shows an example of a flowchart showing a specific procedure for processing executed by the control circuit 18 in the optical disk device 3 regarding rotation speed limitation processing based on the unbalance of the optical disk 11 in the optical disk device 3 in the personal computer system 1.

For example, when the optical disk 11 is inserted into the optical disk device 3, and the optical disk device 3 receives a data read command from the personal computer 2, the control circuit 18 in the optical disk device 3 executes the control program in the main program 52 to check whether or not unbalance detection processing is executed based on disk information about the optical disk 11 in accordance with rotation speed limitation processing procedure RT1 based on the unbalance of the optical disk 11 in FIGS. 5 and 6 (SP11).

If the control circuit 18 in the optical disk device 3 does not execute unbalance detection processing (SP11: NO), the control circuit 18 does not limit the rotation speed of the optical disk 11, and terminates rotation speed limitation processing procedure RT1 based on the unbalance of the optical disk 11 in FIGS. 5 and 6 (SP23).

For example, the control circuit 18 in the optical disk device 3 is configured not to execute rotation speed limitation processing based on the unbalance of the optical disk 11 in the case where the disk information shows that the optical disk 11 is a video disk or 8 cm disk, because the rotation speed is limited separately in such cases.

Meanwhile, if the control circuit 18 in the optical disk device 3 executes unbalance detection processing (SP11: YES), the control circuit 18 executes unbalance detection parameter selection processing (described later) (RT2).

Subsequently, the control circuit 18 in the optical disk device 3 transmits a control signal to rotationally drive the spindle motor 12, thereby starting spinning up of the optical disk 11 (SP12).

The control circuit 18 in the optical disk device 3 then acquires unbalance data indicating the value of unbalance amount of the optical disk 11 based on the lens error signal from the lens error signal detection circuit 33 and the rotation speed information from the rotation speed detection circuit 46 (SP13).

The control circuit 18 in the optical disk device 3 then checks whether or not the rotation speed of the optical disk 11 has reached a target rotation speed (SP14).

The control circuit 18 in the optical disk device 3 is configured to set the target rotation speed to, for example, rise from 45 Hz to 75 Hz by 5 Hz in a stepwise manner. More specifically, the control circuit 18 in the optical disk device 3 sets the first target rotation speed to 45 Hz and then to 50 Hz, 55 Hz, . . . , 75 Hz.

If the rotation speed of the optical disk 11 has not reached a target rotation speed (SP14: NO), the control circuit 18 in the optical disk device 3 then returns to step SP13, and acquires unbalance data again (SP13).

Meanwhile, if the rotation speed of the optical disk 11 has reached a target rotation speed (SP14: YES), the control circuit 18 in the optical disk device 3 checks whether or not unbalance data has been detected (SP15).

If unbalance data has not been detected at the rotation speed (SP15: NO), the control circuit 18 in the optical disk device 3 proceeds to step SP18.

Meanwhile, if unbalance data has been detected at the rotation speed (SP15: YES), the control circuit 18 in the optical disk device 3 refers to the unbalance detection parameter selected in unbalance detection parameter selection processing (RT2), and checks whether or not the detected unbalance data has a value equal to or larger than the maximum value of the unbalance detection parameter (SP16).

If the detected unbalance data does not have a value equal to or larger than the maximum value of the unbalance detection parameter (SP16: NO), the control circuit 18 in the optical disk device 3 stores the detected unbalance data to the SRAM 22 (SP17).

The control circuit 18 in the optical disk device 3 checks whether or not the acquisition of unbalance data at each of all the target rotation speeds has terminated (SP18).

If the acquisition of unbalance data at each of all the target rotation speeds has not terminated (SP18: NO), the control circuit 18 in the optical disk device 3 returns to step SP13, and acquires unbalance data again (SP13). Then, the control circuit 18 repeats the same processing steps as described above (SP14 to SP18).

Meanwhile, if the acquisition of unbalance data at each of all the target rotation speeds has terminated (SP18: YES), the control circuit 18 in the optical disk device 3 checks whether or not unbalance data has been detected (SP19).

If unbalance data has not been detected at all the target rotation speeds (SP19: NO), the control circuit 18 in the optical disk device 3 proceeds to step SP22.

Meanwhile, if unbalance data has been detected at least at target rotation speed among all the target rotation speeds (SP19: YES), the control circuit 18 in the optical disk device 3 searches for the unbalance data with the maximum value among the sets of unbalance data stored in the SRAM 22, and refers to the unbalance detection parameter corresponding to the unbalance data with the maximum value, thereby setting the rotation speed of the optical disk 11 as the rotation speed for the unbalance detection parameter (SP20).

If the detected unbalance data has a value equal to or larger than the maximum value of the unbalance detection parameter selected in unbalance detection parameter selection processing (RT2) (SP16: YES), the control circuit 18 in the optical disk device 3 sets the rotation speed of the optical disk 11 as the rotation speed for the unbalance detection parameter (SP21).

The control circuit 18 in the optical disk device 3 terminates spinning up of the optical disk 11 (SP22), and then terminates rotation speed limitation processing procedure RT1 based on the unbalance of the optical disk 11 in FIGS. 5 and 6 (SP23).

Figure 7:
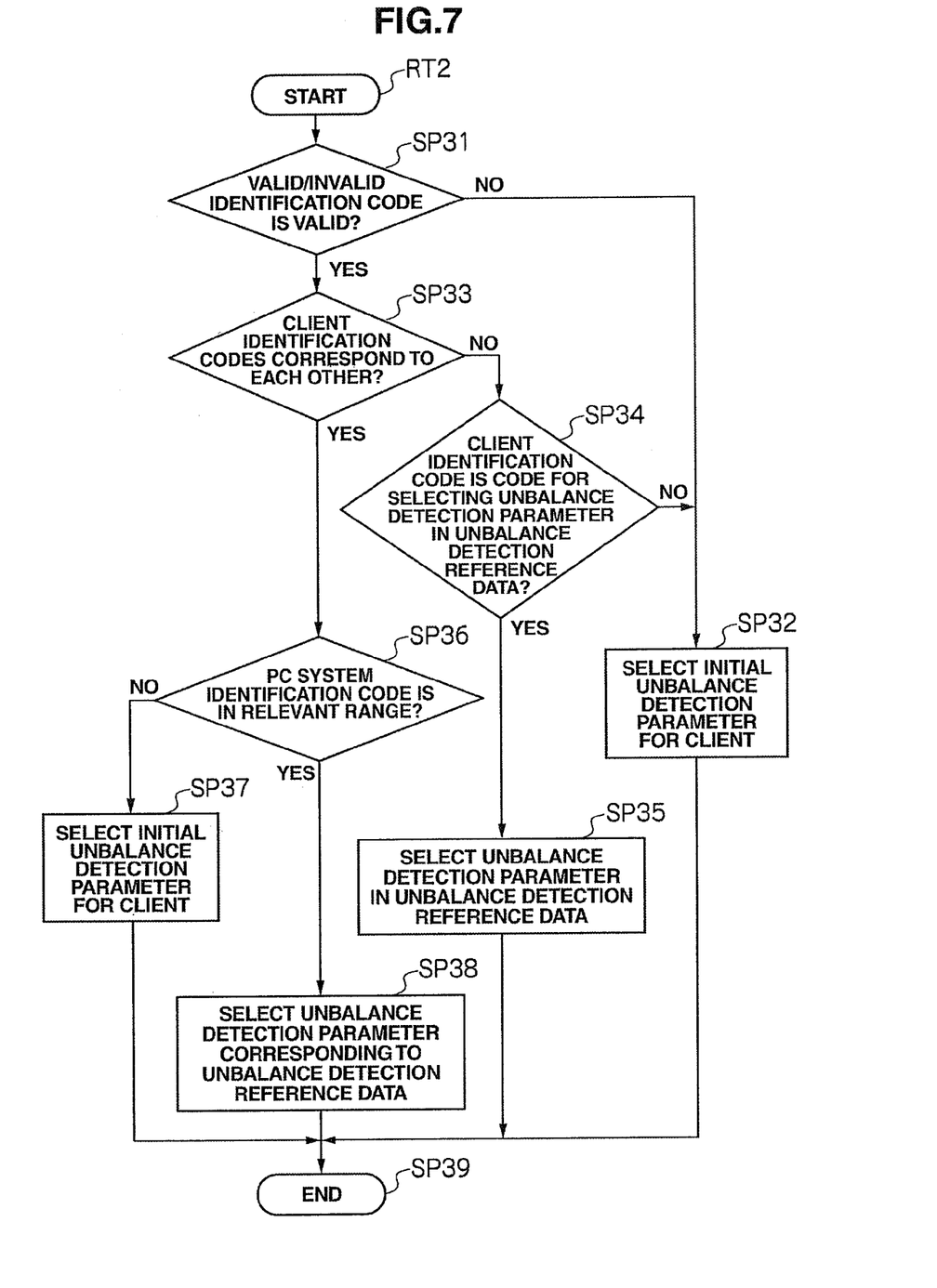
FIG. 7 is a flowchart showing a procedure for unbalance detection parameter selection processing.

Next, unbalance detection parameter selection processing executed by the optical disk device 3 in the personal computer system 1 in this embodiment will be described.

FIG. 7 shows an example of a flowchart showing a specific procedure for processing executed by the control circuit 18 in the optical disk device 3 regarding unbalance detection parameter selection processing of the optical disk device 3 in the personal computer system 1.

If the control circuit 18 in the optical disk device 3 executes unbalance detection processing (SP11: YES), the control circuit 18 executes the control program in the main program 52 to check whether or not the valid/invalid identification code in the valid/invalid identification code column 62A in the unbalance detection reference data 62 is valid in accordance with unbalance detection parameter selection processing procedure RT2 in FIG. 7 (SP31).

More specifically, for example, the control circuit 18 in the optical disk device 3 checks whether or not the valid/invalid identification code column 62A stores the code "55h".

If the valid/invalid identification code in the valid/invalid identification code column 62A is invalid (SP31: NO), indicating that the unbalance detection reference data 62 is invalid, the control circuit 18 in the optical disk device 3 judges this unbalance detection parameter selection processing to be in error, and does not conduct switching of the unbalance detection parameter for reference from the initial unbalance detection parameter for the client corresponding to the client identification code, and selects that initial unbalance detection parameter, in accordance with the client identification code managed in the firmware for a client in the main program 52 (SP32). The control circuit 18 then terminates this unbalance detection parameter selection processing procedure RT2 in FIG. 7 (SP39).

More specifically, for example, when the valid/invalid identification code column 62A stores a code other than "55h" and the firmware for a client in the main program 52 is firmware for company B, the control circuit 18 does not conduct switching of the unbalance detection parameter for reference from the initial unbalance detection parameter for B1-PC of company B, which has been selected previously, in the unbalance detection parameter table 61, and selects that initial unbalance detection parameter.

Meanwhile, if the valid/invalid identification code in the valid/invalid identification code column 62A is valid (SP31: YES), the control circuit 18 in the optical disk device 3 checks whether or not the client identification code managed in the firmware for a client in the main program 52 corresponds to the client identification code stored in the client identification code column 62B in the unbalance detection reference data 62 (SP33).

If those client codes do not correspond to each other (SP33: NO), the control circuit 18 in the optical disk device 3 checks whether or not the client identification code stored in the client identification code column 62B in the unbalance detection reference data 62 is a code for selecting the unbalance detection parameter in the unbalance detection reference data 62 (SP34).

If the client identification code stored in the client identification code column 62B is not a code for selecting the unbalance detection parameter in the unbalance detection reference data 62 (SP34: NO), the control circuit 18 in the optical disk device 3 proceeds to step SP32, and executes the same processing step as above (SP32). The control circuit 18 then terminates this unbalance detection parameter selection processing procedure RT2 in FIG. 7 (SP39).

Meanwhile, if the client identification code stored in the client identification code column 62B is a code for selecting the unbalance detection parameter in the unbalance detection reference data 62 (SP34: YES), the control circuit 18 in the optical disk device 3 conducts switching of the unbalance detection parameter for reference from the initial unbalance detection parameter in the unbalance detection parameter table 61 to the unbalance detection parameter stored in the unbalance detection parameter (for direct reference) column 62D and select that unbalance detection parameter (SP35). The control circuit 18 then terminates this unbalance detection parameter selection processing procedure RT2 in FIG. 7 (SP39).

More specifically, for example, the optical disk device 3 checks whether or not the client identification code column 62B stores "42h".

Also, if the firmware for a client in the main program 52 is the firmware for company B and the client identification code column 62B in the unbalance detection reference data 62 stores "42h", the optical disk device 3 conducts switching of the unbalance detection parameter for reference from the initial unbalance detection parameter for B1-PC of company B, which has been selected previously, in the unbalance detection parameter table 61 to the unbalance detection parameter stored in the unbalance detection parameter (for direct reference) column 62D in the unbalance detection reference data 62, and selects that unbalance detection parameter.

Meanwhile, if the client identification codes correspond to each other (SP33: YES), the control circuit 18 in the optical disk device 3 checks whether or not the PC identification code stored in the PC identification code column 62C in the unbalance detection reference data 62 is within the range (SP36).

More specifically, for example, it is assumed in the optical disk device 3 that the client identification code for company B is "02h", the PC identification code for the company B, B1-PC personal computer 2 is "01h", the PC identification code for the company B, B2-PC personal computer 2 is "02h" and the PC identification code for the company B, B3-PC personal computer 2 is "03h".

At this point, in the optical disk device 3, when no PC identification code other than the above PC identification codes exists as the PC identification codes for the personal computers 2 of company B and the client identification code column 62B in the unbalance detection reference data 62 stores "02h" and the PC identification code column 62C stores "04h", this indicates that the PC identification code is not within the range.

Also, in the optical disk device 3, when the client identification code column 62B in the unbalance detection reference data 62 stores "02h" and the PC identification code column 62C stores "03h", this indicates that the PC identification code is within the range.

If the PC identification code stored in the PC identification code column 62C is not within the range (SP36: NO), the control circuit 18 in the optical disk device 3 executes the same processing step as step SP32 above (SP37), and then terminates this unbalance detection parameter selection processing procedure RT2 in FIG. 7 (SP39).

Meanwhile, if the PC identification code stored in the PC identification code column 62C is within the range (SP36: YES), the control circuit 18 in the optical disk device 3 conduct switching of the unbalance detection parameter for reference from the initial unbalance detection parameter in the unbalance detection parameter table 61 to the unbalance detection parameter corresponding to the unbalance detection reference data 62, and selects that unbalance detection parameter (SP38). The control circuit 18 then terminates this unbalance detection parameter selection processing procedure RT2 in FIG. 7 (SP39).

More specifically, for example, when the client identification code column 62B in the unbalance detection reference data 62 stores "02h" and the PC identification code column 62C stores "03h", the optical disk device 3 conducts switching of the unbalance detection parameter for reference from the initial unbalance detection parameter for B1-PC of company B, which has been selected previously, in the unbalance detection parameter table 61 to the unbalance detection parameter for B3-PC of company B, and selects that unbalance detection parameter.

As described above, in the personal computer system 1, the personal computer 2 issues the data write command, and transmits the command to the optical disk device 3; and the optical disk device 3 creates the unbalance detection reference data 62 based on the data write command, and conducts switching of the unbalance detection parameter for reference from the initial unbalance detection parameter in the unbalance detection parameter table 61 to the unbalance detection parameter corresponding to the unbalance detection reference data 62 and selects that unbalance detection parameter.

Accordingly, in the personal computer systems 1, the personal computers 2 of plural types for different systems can be dealt with by only installing the optical disk devices 3 each having firmware of the same type, without installing the optical disk devices 3 each having firmware in which an unbalance detection parameter is set depending on the type of the personal computer 2. As a result, the optical disk devices can be managed easily.

Also, in the personal computer system 1, the optical disk device 3 can select the unbalance detection parameter depending on the type of the personal computer 2 by only transmitting the data write command, without the personal computer 2 setting or specifying the unbalance detection parameter. Accordingly, the size of the program installed in the personal computer 2 can be reduced markedly, and also the load on the personal computer 2 can be reduced markedly.

Note that while the above embodiment mode has been described for the case where the initial unbalance detection parameter is set for each client, the invention is not limited to this. For example, the unbalance detection parameter independent of the client is set, and as a result, the personal computers 2 of plural types can be dealt with not only by installing the optical disk devices 3 each having firmware of the same type in the personal computers 2 on a per-client basis, but also, by installing the optical disk devices 3 each having firmware of the same type in the personal computers 2 irrespective of the client.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical disk device installed in a personal computer, comprising:
    an information creation unit that creates identification information for identifying the type of the personal computer based on a command transmitted from the personal computer; and
    a parameter selection unit that conducts switching, for parameter selection, concerning a parameter indicating an amount of unbalance of an optical disk, which has previously been determined depending on the type of the personal computer, in accordance with the identification information created by the information creation unit.

2. The optical disk device according to claim 1, wherein the parameter selection unit conducts switching from an initial parameter, which has previously been stored in memory and selected, to a parameter which corresponds to the identified type of the personal computer and which has previously been stored in the memory.

3. The optical disk device according to claim 1, wherein:
    the identification information includes a direct reference parameter for directly referring to that parameter without referring to a parameter that has previously been stored in memory; and
    the parameter selection unit, when determining that the parameter is referenced via direct reference without referring to the parameter that has previously been stored in the memory, conducts switching from an initial parameter, which has previously been stored in memory and selected, to the direct reference parameter.

4. The optical disk device according to claim 1, wherein the parameter selection unit, when determining that the identification information is invalid, does not switch an initial parameter, which has previously been stored in memory and selected, and selects that initial parameter.

5. The optical disk device according to claim 1, wherein:
    the information creation unit stores the created identification information in memory; and
    when the same identification information as the created identification information has been stored, the information creation unit does not store the created identification information in the memory.

6. A parameter selection method for an optical disk device installed in a personal computer, comprising:
    a first step of creating identification information for identifying the type of the personal computer based on a command transmitted from the personal computer; and
    a second step of conducting switching, for parameter selection, concerning a parameter indicating an amount of unbalance of an optical disk, which has previously been determined depending on the type of the personal computer, in accordance with the identification information created in the first step.

7. The parameter selection method according to claim 6, wherein the second step comprises conducting switching from an initial parameter, which has previously been stored in memory and selected, to a parameter which corresponds to the identified type of the personal computer and which has previously been stored in the memory.

8. The parameter selection method according to claim 6, wherein:
    the identification information includes a direct reference parameter for directly referring to that parameter without referring to a parameter that has previously been stored in memory; and
    the second step comprises, when it is determined that the parameter is referenced via direct reference without referring to the parameter that has previously been stored in the memory, conducting switching from an initial parameter, which has previously been stored in memory and selected, to the direct reference parameter.

9. The parameter selection method according to claim 6, wherein: the second step comprises, when it is determined that the identification information is invalid, not switching an initial parameter, which has previously been stored in memory and selected, and selecting that initial parameter.

10. The parameter selection method according to claim 6, wherein the first step comprises:
    storing the created identification information in memory; and
    when the same identification information as the created identification information has been stored, not storing the created identification information in the memory.

* * * * *